(12) United States Patent
Dobie

(10) Patent No.: US 8,064,593 B1
(45) Date of Patent: Nov. 22, 2011

(54) AUTO HOST DISCONNECT ON LOSS OF POWER TO A HEADSET AMPLIFIER

(75) Inventor: Ian S. Dobie, Swindon (GB)

(73) Assignee: Plantronics, Inc., Santa Cruz, CA (US)

( * ) Notice: Subject to any disclaimer, the term of this patent is extended or adjusted under 35 U.S.C. 154(b) by 1700 days.

(21) Appl. No.: 11/341,220

(22) Filed: Jan. 26, 2006

(51) Int. Cl.
*H04M 9/00* (2006.01)
*H04M 11/00* (2006.01)

(52) U.S. Cl. .............................. 379/395.01; 379/100.15

(58) Field of Classification Search .................. 379/387, 379/395, 395.01, 100.15
See application file for complete search history.

(56) References Cited

U.S. PATENT DOCUMENTS

| | | | | |
|---|---|---|---|---|
| 5,226,077 A | * | 7/1993 | Lynn et al. | 379/395 |
| 5,396,551 A | * | 3/1995 | Lucey | 379/395 |
| RE35,536 E | * | 6/1997 | Irissou et al. | 379/395 |
| 5,926,543 A | * | 7/1999 | Lynn et al. | 379/395 |
| 5,982,879 A | * | 11/1999 | Lucey | 379/390.01 |
| 5,991,645 A | * | 11/1999 | Yuen et al. | 455/575.2 |
| 6,137,879 A | * | 10/2000 | Papadopoulos et al. | 379/387.01 |
| 6,330,325 B1 | | 12/2001 | Reid et al. | |
| 6,600,821 B1 | * | 7/2003 | Chan et al. | 379/265.07 |
| 6,771,742 B2 | | 8/2004 | McCalmont et al. | |
| 6,862,464 B1 | * | 3/2005 | Son | 455/572 |
| 6,965,669 B2 | * | 11/2005 | Bickford et al. | 379/265.07 |
| 7,162,016 B1 | * | 1/2007 | Schmidt et al. | 379/100.15 |
| 2004/0184590 A1 | * | 9/2004 | Jia | 379/142.04 |
| 2004/0192362 A1 | * | 9/2004 | Vicari | 455/507 |
| 2004/0229658 A1 | * | 11/2004 | Kim et al. | 455/569.1 |
| 2004/0258253 A1 | * | 12/2004 | Wurtz | 381/71.6 |
| 2005/0013447 A1 | * | 1/2005 | Crump et al. | 381/71.6 |
| 2007/0076897 A1 | * | 4/2007 | Philipp | 381/74 |
| 2007/0121959 A1 | * | 5/2007 | Philipp | 381/74 |
| 2008/0164770 A1 | * | 7/2008 | Terlizzi | 307/125 |
| 2008/0205663 A1 | * | 8/2008 | Crump et al. | 381/71.6 |
| 2009/0074196 A1 | * | 3/2009 | Tiodor et al. | 381/58 |

* cited by examiner

*Primary Examiner* — Davetta W Goins
*Assistant Examiner* — Mohammad Islam
(74) *Attorney, Agent, or Firm* — The Intellectual Property Law Office of Thomas Chuang (57) ABSTRACT

Systems for a loss of power detection for headset amplifiers are disclosed. The system generally includes a headset and headset amplifier. The headset amplifier includes a switch for electrically connecting the headset and a telephone apparatus. The switch is closed when the headset amplifier is in a powered status and the switch is open when the headset amplifier is in a powerless status.

22 Claims, 5 Drawing Sheets

AUTO HOST DISCONNECT ON LOSS OF POWER TO A HEADSET AMPLIFIER

BACKGROUND OF THE INVENTION

A significant use of telephone headsets is in connection with automatic in-bound and out-bound telephone systems. Automatic in-bound telephone systems typically include an Automatic Call Distributor (ACD). The ACD is a call control apparatus used for connecting an incoming call to an operator at a workstation. The ACD utilizes a computer to automatically route telephone calls to workstations (also referred to individually herein as a host telephone workstation, host telephone system, or telephone apparatus) connected to the system. The calls may be routed using a variety of algorithms. For example, calls may be routed in a way that balances the call load equally between the workstations, with each workstation occupied by a telephone operator. An ACD may also simply distribute an incoming call by detecting which communication line to an operator is not in use.

Each workstation is connected to a telephone line by an exchange (also referred to as a local exchange). The exchange comprises a trunk for interfacing with a public or private network and a plurality of line circuits, each used for interfacing with one of the workstations. When an incoming call arrives at the trunk, a central control apparatus notifies the ACD of the incoming call. The ACD then determines which workstation receives the incoming call.

In order for the ACD to know which telephone operators are available to receive calls, each telephone operator is required to log on to the system each time he occupies his workstation, and to log off the system each time he leaves his workstation. The ACD will not route calls to any workstations at which the operator is unavailable, so long as the operator has logged off. If the operator returns to his/her workstation and fails to log on, the ACD will continue to route calls away from the operator's workstation, thereby unnecessarily increasing the workload of other workstations.

Typically, an operator utilizes a telephone headset connected to an amplifier which, in turn, is connected to the workstation. The workstation is connected to the ACD. The amplifier is generally used to amplify signals to or from a telephone headset. An operator leaving his or her work station unplugs the headset amplifier from the telephone workstation. The removal of the amplifier is detected by the telephone workstation which serves to notify the ACD that no operator is present at the telephone workstation.

In one application, the headset amplifier receives the audio signal from the telephone workstation, limits the maximum amplitude of the audio signal to improve operator safety, and provides a power output to drive the speaker of the telephone headset. The headset amplifier may provide power for the headset microphone, receives the audio signal from the microphone, and modifies the gain of the audio signal from the microphone.

Figure 1:
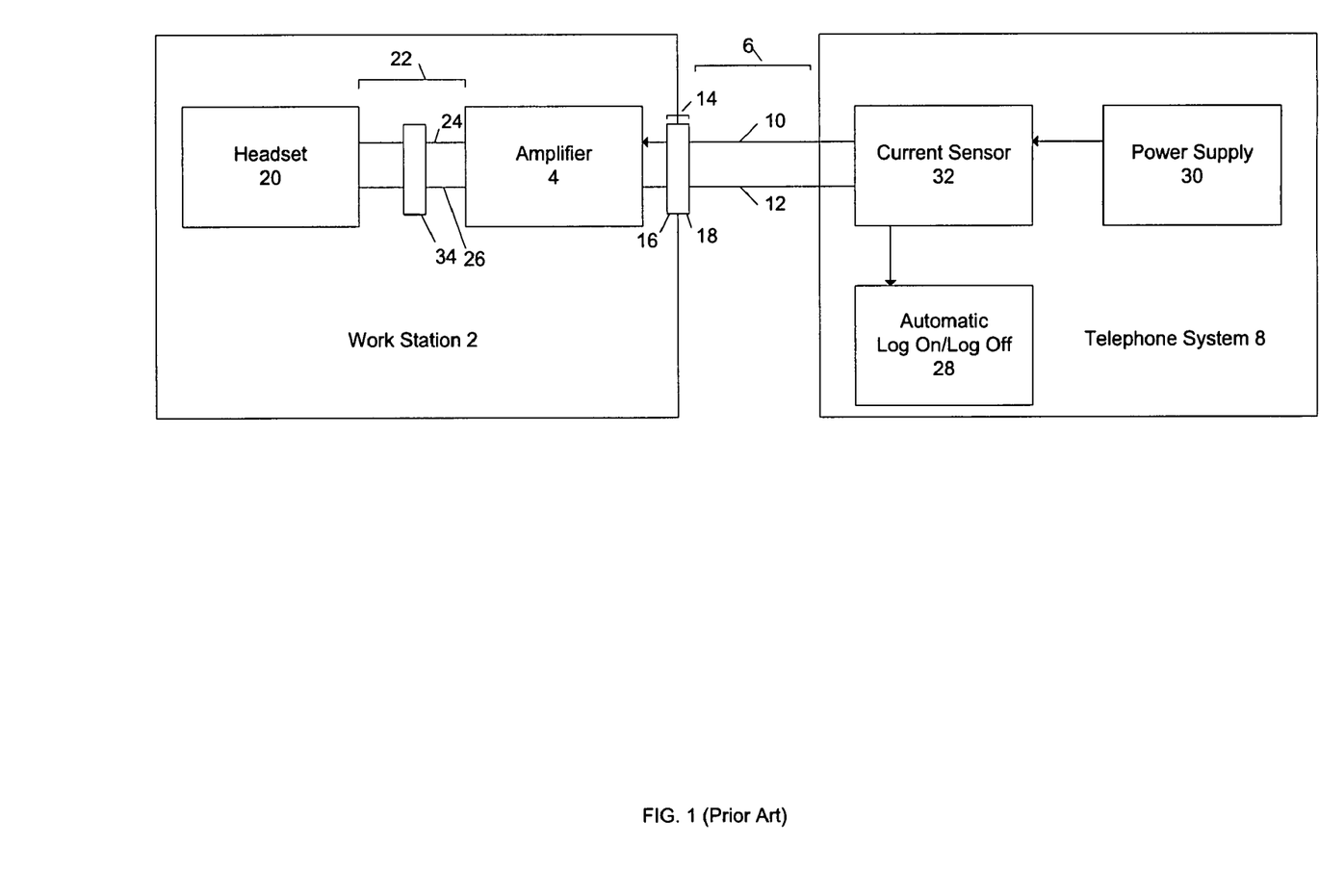
FIG. 1 illustrates a prior art operator log on/log off headset system.

In one prior art system discussed in U.S. Pat. No. 5,226, 077, an operator may log off automatically by unplugging the headset or amplifier from the workstation. Such a system is illustrated in FIG. 1. A workstation 2, which is normally one of several workstations connected to the telephone system 8, has an amplifier 4 between the telephone system 8 and the headset 20. A cord 6 connects the amplifier 4 to the telephone system 8. The amplifier is powered by the telephone system 8, and draws a current of several milliamps from telephone system 8. The cord 6 includes the conductor 10 for DC power and the conductor 12, which provides the ground connection. The transmit signal from the amplifier 4 is normally superimposed on the conductor 10. Alternatively, an additional conductor (not shown) in the cord 6 may be used for the transmit signal. Finally the cord 6 includes receive conductors, which have been omitted for clarity. The cord 6 is interrupted by the connector 14, comprising the plug 16 and the socket 18. The connector 14 allows the amplifier 4 and the headset 20 to be disconnected from the workstation.

The headset 20 includes an earphone (not shown) and a microphone (not shown). Typically, an electret microphone is used, which requires that the amplifier 4 supply DC power of a few volts at between 15 and several hundred microamps to the headset. A cord 22 interconnects the headset 20 and the amplifier 4. The cord 22 includes the conductor 24 for DC power and the conductor 26, which provides the ground connection. The transmit signal from the microphone iri the headset (not shown) is normally superimposed on the conductor 24. Alternatively, an additional conductor (not shown) may be used for the transmit signal. Finally, the cord 22 includes receive conductors, which have been omitted for clarity. The cord 22 is interrupted by the connector 34, comprising a plug and socket connector (also referred to as a "quick disconnect" or QD). The connector 34 enables the operator to disconnect the headset from the amplifier when he/she leaves the workstation 2. Normally, the connector 34 is mounted in the cord 22 close to the headset, but it can be an integral part of the headset or an integral part of the amplifier.

Applications handling a large volume of telephone calls have a plurality of workstations, each with its own telephone connector 14, amplifier 4, headset 20 and necessary interconnecting cords. The workstations are connected to the telephone system 8. The telephone system may include an Automatic Call Distributor (ACD) for distributing the calls evenly between occupied workstations, i.e., workstations at which an operator is logged on. Alternatively, the ACD may be remote from the telephone system 8.

The telephone system 8 includes an automatic log on/log off system 28 that automatically logs a workstation 2 off the telephone system 8 when the occupant leaves the workstation. Some automatic log on/log off systems automatically log the workstation back onto the telephone system when the occupant returns. Other automatic log on/log off systems require the occupant to log back in manually.

When the amplifier 4 is disconnected from the telephone system 8 using connector 14, the automatic log on/log off system 28 causes the telephone system 8 to take an action that is appropriate in view of the fact that the workstation 2 is no longer occupied. For example, in a small office system with a single telephone operator, it can cause the telephone system to go temporarily into its night service mode so that incoming calls do not go unanswered. In a large system with ACD, it prevents the telephone system from directing calls to the unoccupied workstation. When the amplifier 4 is re-connected to the telephone system 8, the automatic log on/log off system 28 may cause the telephone system to reverse the action previously taken, or the occupant may have to log back in manually.

FIG. 1 shows a telephone system 8 with an automatic log on/log off system controlled by the current sensor 32 that detects whether or not the amplifier 4 is connected to the telephone system by monitoring the current drawn by amplifier 4 from the telephone system 8. Current from a power supply 30 in the telephone system is supplied to the conductor 6, and to the amplifier 4, through the current sensor 32. The current sensor 32 provides an output signal to the automatic log on/log off system 28. When the current supplied to the amplifier is greater than a threshold value, typically about one hundred microamps, the current sensor 32 provides an output signal in a first state that indicates that the amplifier is connected to the telephone system. When the current supplied to the amplifier is less than the threshold value, the current sensor provides an output signal in a second state that indicates that the amplifier has been disconnected from the telephone system. The state of the output signal from the current sensor thus informs the automatic log on/log off system 28 whether or not the amplifier 4 is connected to the telephone system 8, and the automatic log on/log off system can thus cause the telephone system to take appropriate action.

The connector 34 in the cord 22 between the amplifier 4 and the headset 20 enables the occupant to leave the workstation while continuing to wear his/her headset without having to disconnect the amplifier from the telephone system 8. Methods for detecting decoupling of connector 34 are discussed in U.S. Pat. No. 5,226,077. For example, a detector may monitor the current drawn from the amplifier by the headset.

In the prior art, headset amplifiers have used power drawn from the telephone workstations. However, many headset amplifiers in use today have increased power requirements as the amplifier includes a digital signal processor (DSP) for implementing signal processing. Such signal processing may include automatic gain control. The signal processing may serve to protect the user by limiting the maximum volume level output to the user. Due to increased power requirements by the headset amplifiers to implement functions such as gain control, powering the headset amplifier using current drawn from the telephone workstation is often impractical or insufficient. As a result, headset amplifiers are now often powered with a battery or from power derived from the USB port of a PC or from an AC wall outlet using a DC power supply. Batteries provide a convenient power source for a telephone headset amplifier, but, since they have finite life, powering a telephone headset from batteries can be relatively expensive, and can also present reliability problems as power levels decrease.

With the advent of wall outlet, USB Power from a PC or battery powered headset amplifiers, there is a possibility that power to the headset amplifier will be inadvertently lost if the amplifier wall outlet plug becomes dislodged or battery power runs below a threshold level.

Although the prior art systems allow an ACD to automatically detect when an operator has manually disconnected a headset from the headset amplifier or the headset amplifier from a telephone workstation, the prior art systems do not detect when the headset amplifier has lost power. For example, power may be lost when the amplifier mains connector is dislodged or when battery power drops below a pre-determined level. As a result, the ACD will continue to route calls to an operator workstation that has lost power. Furthermore, the operator at the workstation is unaware that power to the amplifier has been lost. An available operator at the workstation will therefore fail to receive calls until power is restored.

The need for an ACD to accurately route calls to available operators is particularly important in the emergency services field. In such an application, the ability of the ACD to detect the availability of an operator and functionality of equipment they use is vital before a call is placed thru to the operator. For example, ACDs are used with abbreviated number systems such as the 9-1-1 system in the United States, which was developed for handling emergency service calls. Similar abbreviated number systems are in place in other countries for handling emergency service calls. Typically, an emergency service call center is connected to the PSTN and routes the emergency calls to an operator at a workstation.

To improve the performance of ACD systems in routing calls to available operators, it is desirable that a telephone workstation detect whether a headset amplifier has lost power. As a result, there is a need for improved methods and apparatuses for headset amplifiers and associated telephone workstations.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

A method and apparatus for auto host disconnect on loss of power to a headset amplifier is disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Particular circuit layouts and circuit components may be given for illustrative purposes. This is done for illustrative purposes to facilitate understanding only and one of ordinary skill in the art may vary the design and implementation parameters and still remain within the scope of the invention.

In one example of the invention, a headset system includes a headset and a headset amplifier for amplifying a signal received from a telephone workstation to produce an amplified signal. The amplified signal is transferred to the headset for output by the headset speaker. The headset amplifier includes a powered switch for electrically connecting the headset and the telephone workstation. The switch is closed when the headset amplifier is in a powered status and the switch is open when the headset amplifier is in a powerless status.

In a further example of the present invention, a telephone call distribution system such as an emergency services system determines whether an operator at a telephone workstation is capable of receiving an incoming call by determining whether a headset amplifier at the workstation is correctly receiving power. The headset amplifier includes a powered switch for electrically connecting the headset and the telephone workstation, wherein the switch is closed when the headset amplifier is in a powered status and the switch is open when the headset amplifier is in a powerless status. In the case of a battery powered headset amplifier, the switch may be opened when the battery power drops below a predetermined threshold level. The powered switch may be placed in the transmit path between the headset microphone and the telephone workstation. Alternatively, the switch could be placed in the receive path and the loss of a known impedance detected by the telephone workstation. The telephone call distribution system (also referred to herein as an automatic call distributor) detects when the headset amplifier is in a powered status or powerless status and responsively routes a call to or away from the telephone workstation.

In a further example of the invention, a headset amplifier includes a transmit line and a receive line. The transmit line receives a transmit signal from a microphone at a headset and outputs the transmit signal to a telephone apparatus. The receive line receives a receive signal from the telephone apparatus and outputs the receive signal to a receiver at the headset. The receive line includes a circuit for amplifying signals passing between the telephone apparatus and headset. A switching means is disposed in the transmit line for opening or closing responsive to the power status of the headset amplifier.

Figure 2:
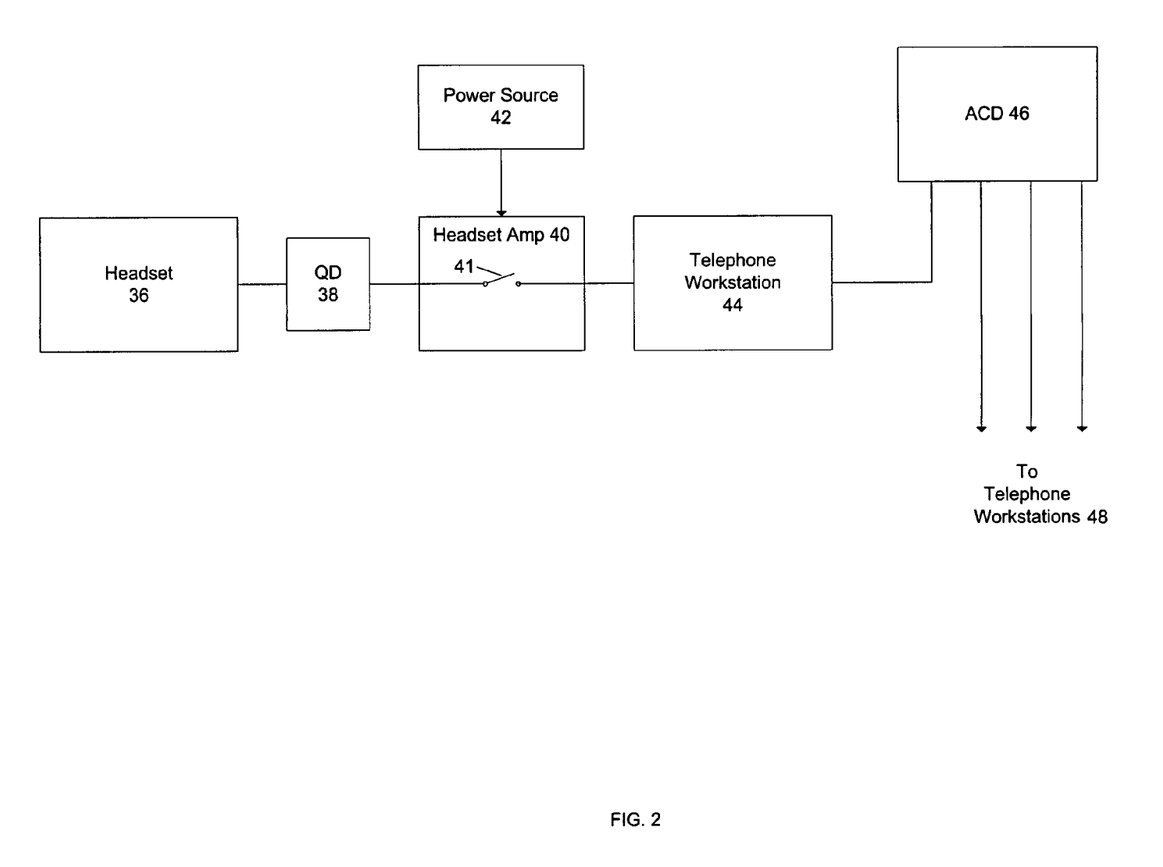
FIG. 2 illustrates simplified block diagram of a loss of power detection system for headset amplifiers.

Generally, this description describes a loss of power detection for headset amplifiers. FIG. 2 illustrates a simplified block diagram of a loss of power detection for headset amplifiers 2 in one embodiment of the invention. Loss of power detection for headset amplifiers 2 is suitable for use, for example with routing incoming calls in call center operations.

In brief overview, FIG. 2 illustrates an example of a headset system having a headset amplifier 40 having a switch 41 which is automatically opened when headset amplifier 40 loses power. Referring to FIG. 2, a telephone workstation 44 is connected to a headset amplifier 40. For example, telephone workstation 44 may be a telephone connected to a telephone network or a computer implementing Voice over Internet Protocol (VoIP) connected to a data network. Headset amplifier 40 is connected or linked to a headset 36. In the example shown in FIG. 2, headset 36 is linked to headset amplifier 40 via a wired link and removably coupled with a quick disconnect connector 38 disposed in between. The operation of quick disconnect connector 38 is similar to that of the prior art discussed above in reference to FIG. 1 and will not be discussed further. In a further example, headset 36 may be linked to headset amplifier 40 with a wireless link utilizing, for example, Bluetooth, DECT, or other wireless communication protocol.

When the link between the headset 36 and the headset amplifier 40 is intentionally broken utilizing quick disconnect connector 38, a detector circuit within headset amplifier 40 or telephone workstation 44 will detect the uncoupling. For example, the detector circuit may use a detection scheme based on a change in resistance resulting from the disconnection.

Headset amplifier 40 receives D.C. power from a power source 42. Power source 42 may be power supply unit with an AC/DC converter (also referred to herein as a wall wart) connected to a standard wall outlet, power from a USB port of a PC or may be a battery. Where power source 42 is a battery, the battery may be located within the housing of headset amplifier 40 rather than external as shown in FIG. 2. Furthermore, where power source 42 is a battery, a headset amplifier 42 controller monitors the power output of the battery and opens switch 41 when the power level drops below a predetermined voltage threshold level for example.

Switch 41 is closed when headset amplifier 40 is receiving power and open when power is lost or below a certain threshold level. For example, switch 41 may be a relay, transistor, or logic gates.

When the headset amplifier 40 loses power from power source 42 or the power level from power source 42 drops below a certain threshold level, switch 41 is opened or presents a high resistance. Upon opening of switch 41, the telephone workstation 44 detects the action of switch 41 and thereby notifies an automatic call distributor 46 that the workstation 44 is unavailable to receive calls. Automatic call distributor 46, which is connected to a plurality of telephone workstations 48, receives the notification from telephone workstation 44 and routes any incoming calls away from telephone workstation 44 to available telephone workstations 48. In a further example, an ACD is not used and telephone workstation 44 notifies the headset user upon detection of an action by switch 41.

Figure 3:
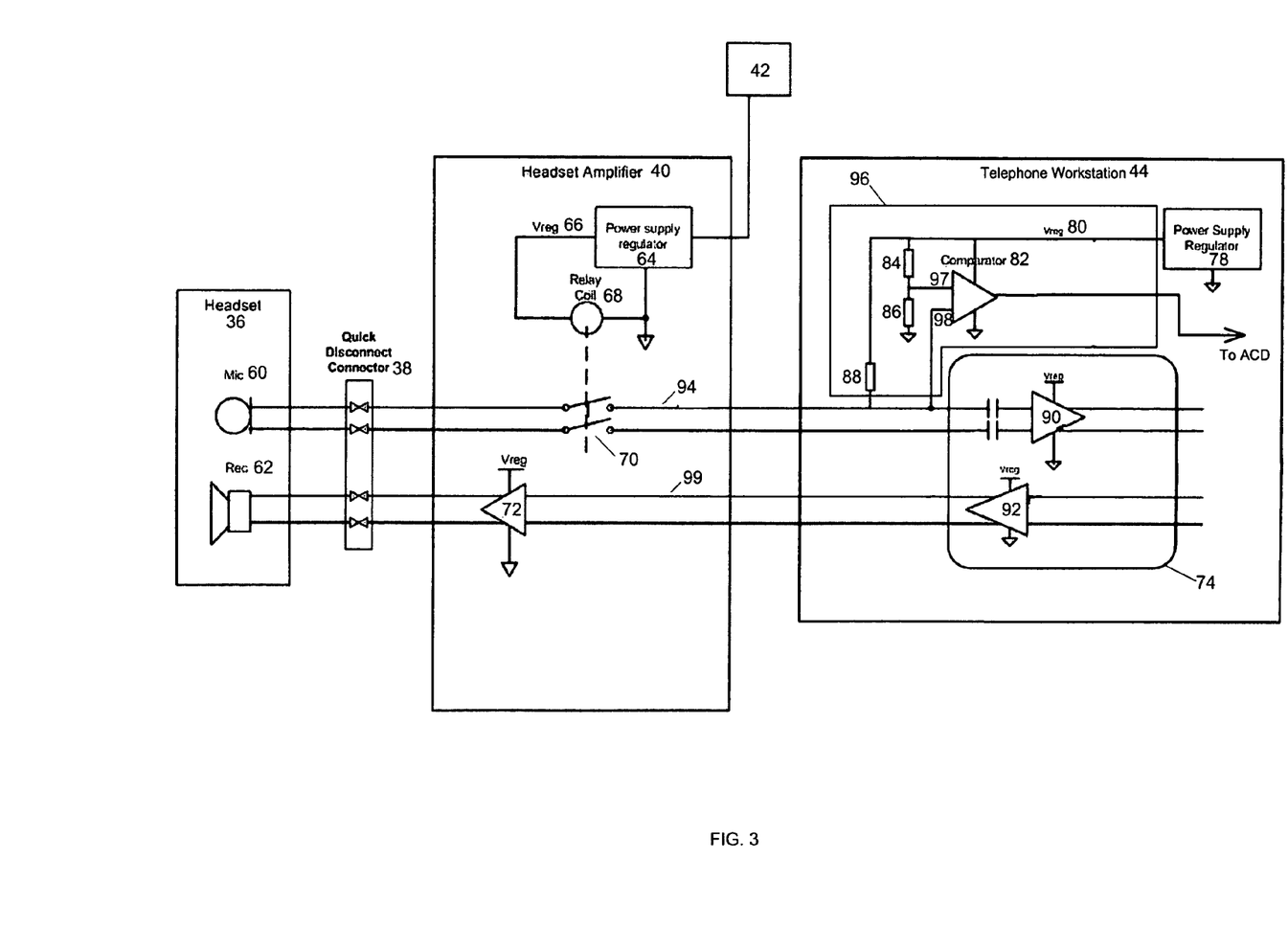
FIG. 3 illustrates a simplified detailed diagram of the components and circuits that implements the block diagram of FIG. 2.

The basic operation of loss of power detection for a headset amplifier can be considered on the basis of the block diagram illustration of FIG. 2. Achievement of some of the objectives of the invention can best be understood by consideration of the specific circuits of FIG. 3. Merely as an example, FIG. 3 illustrates a simplified detailed diagram of a circuit which may be used to implement the block diagram of FIG. 2. In further examples, a variety of components and component arrangements may be used to implement the functions set forth and described in FIG. 2.

As shown in FIG. 3, a headset amplifier 40 generally includes a power supply regulator 64 which is coupled to power supply 42. Power supply regulator 64 provides a regulated voltage Vreg 66 which energizes a relay coil 68 that closes relay contacts 70 when power is received from power source 42. When power from power source 42 is lost, relay coil 68 de-energizes and relay contacts 70 open. Headset amplifier 40 further includes an amplifier circuit 72 for amplifying a signal received from telephone workstation 44 to be output to a receiver 62 at headset 36. In one example, relay contacts 70 are in the transmit path between a microphone 60 at headset 36 and a telephone workstation 44. As a result, when relay contacts 70 open, the transmit path in the headset amplifier 40 between headset 36 and telephone workstation 44 is broken. Although no amplifier or additional processing is shown on the transmit line 94 of headset amplifier 40, in further examples amplifier 40 may perform amplification or other signal processing on both the transmit and receive signal. For example, where a wireless link is used between headset 36 and headset amplifier 40, an amplifier may be utilized on the microphone transmit line.

The telephone workstation 44 circuit generally comprises an audio signal processing block 74 and a headset amplifier power detection circuit 96. The headset amplifier power detection circuit may have a variety of configurations with a variety of components. In the example shown in FIG. 3, a power supply regulator 78 provides a regulated voltage Vreg 80. The regulated voltage Vreg 80 is coupled to a first terminal of a resistor 88. The second terminal of resistor 88 is coupled to the transmit line 94. Regulated voltage Vreg 80 is also coupled to a first terminal of a resistor 84. The second terminal of resistor 84 is coupled to a first input 97 of a comparator 82. A first terminal of a resistor 86 is also coupled to the first input 97 of comparator 82. The second terminal of resistor 86 is coupled to a ground rail. A second input 98 of comparator 82 is coupled to transmit line 94.

Comparator 82 receives at the first input 97 a reference voltage Vref based on Vreg and the values of resistor 84, resistor 86, and resistor 88. The value of Vref can be expressed as:

$$V_{ref(97)} = V_{reg(80)}(R_{86}/(R_{86}*R_{84}))$$

The reference voltage Vref serves as the threshold level for determining whether the headset amplifier 40 is currently receiving power. Comparator 82 receives at the second input 98 the voltage level on transmit line 94. The voltage level on transmit line 94 is lower than reference voltage Vref when relay contacts 70 are closed. The voltage level on transmit line 94 is higher than the reference voltage Vref when relay contacts 70 are open, indicating that the headset amplifier 40 is not receiving power. In one example, the output of comparator 82 is high when relay contacts 70 are closed and low when relay contacts 70 are open. Alternatively, the output of comparator is designed to be low when relay contacts 70 are closed and high when relay contacts 70 are open. Referring to FIG. 2 and FIG. 3, the output of comparator 82 is sent to ACD 46.

In operation, when power from power source 42 is interrupted, relay contacts 70 are opened resulting in a break in the transmit line 94. The headset amplifier power detection circuit 96 at the telephone workstation 44 detects this break. For example, upon notification from telephone workstation 44 that the headset amplifier has insufficient power, the ACD can modify the operation of the local switch so that no further calls are routed to the work station 44. Further, if a call was in progress, the ACD can put that call on hold and route the call to another workstation to continue the conversation so the call is not lost. When the headset amplifier 40 regains power, the telephone workstation 44 detects the closing of the switch 4 supplies a signal to the ACD. The ACD can then begin routing new calls to the work station.

The scope of the subject invention is intended to include a wide range of detection schemes for determining when the headset amplifier 40 has lost power or gone from a loss of power status to a powered status. For example, the headset amplifier power detection circuit may operate based on changes in current levels in the transmit line 94. In further examples, the detection scheme may be based on the receive line. In one example, relay contacts 70 are located in the receive line 99.

Audio signal processing block 74 performs processing on either the transmit signal received from microphone 60 on transmit line 94 or a receive signal from a far end user to be transmitted on receive line 94 to receiver 62, or both. For example, an amplifier 90 may amplify the transmit signal received from microphone 60. An amplifier 92 may amplify the receive signal from a far end user. Various signal processing techniques may be employed in audio signal processing block 74, including for example noise reduction, automatic gain control, and echo cancellation through the user of digital signal processors. These signal processing techniques may also be performed by a digital signal processor at headset amplifier 40. Although FIG. 3 illustrates certain circuit components in the loss of power detection circuit 96, the location of particular electrical components may be varied. The circuits described herein may, for example, be implemented on an application specific integrated circuit.

Figure 4:
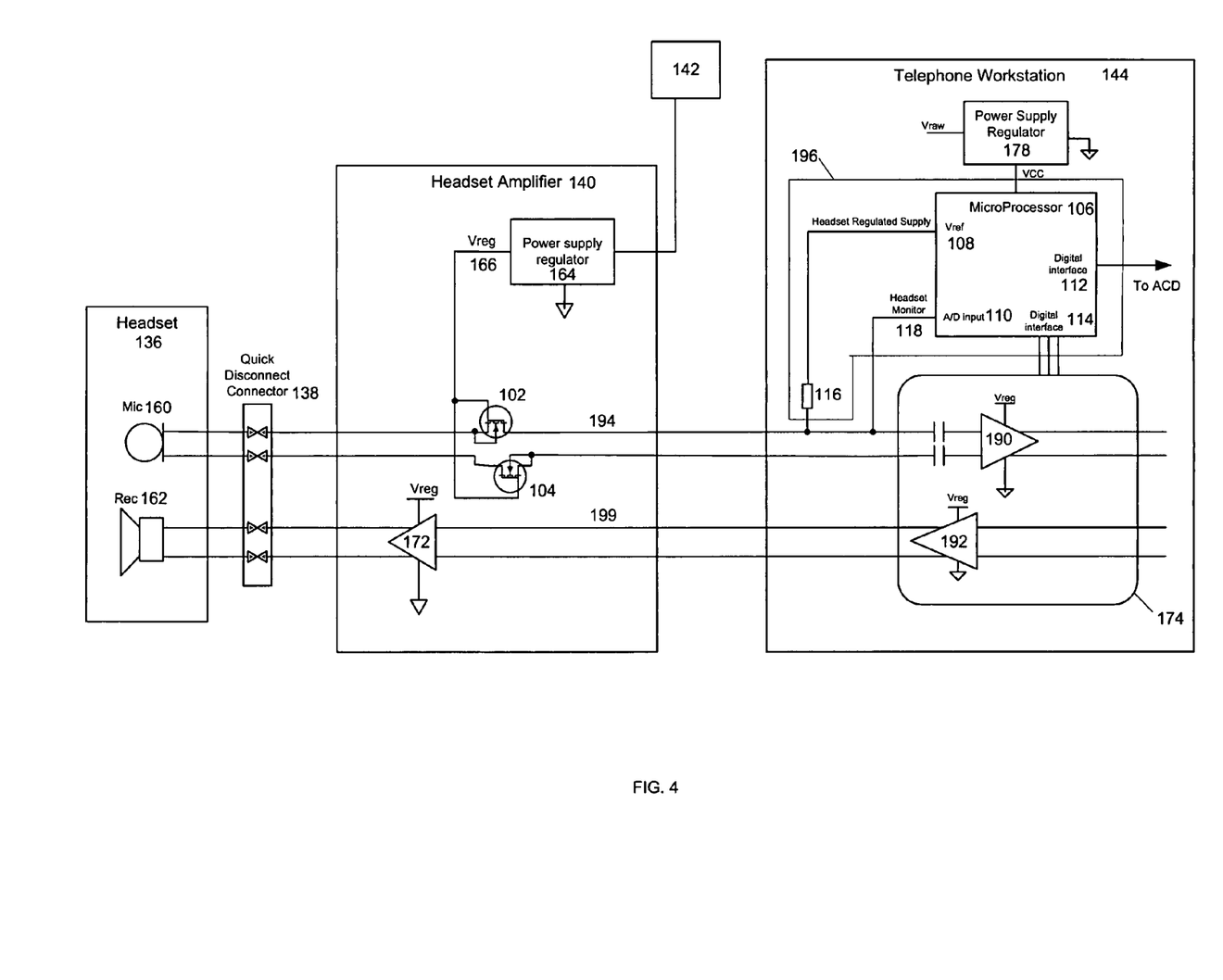
FIG. 4 illustrates a further example a loss of power detection system for headset amplifiers.

FIG. 4 illustrates a simplified detailed diagram of a circuit which may be used to implement the block diagram of FIG. 2 in a further example of the invention. FIG. 4 illustrates a further example of a headset amplifier switch and a further example of a headset amplifier power detection circuit.

As shown in FIG. 4, a headset amplifier 140 generally includes a power supply regulator 164 which is coupled to power supply 142. Power supply regulator 164 provides a regulated voltage Vreg 166 to a FET 102 and FET 104 located in transmit line 194 which maintains FET 102 and FET 104 in a low-impedance on state when power is received from power source 42. When power source 142 is lost, FET 102 and FET 104 enter a high-impedance off state resulting from a low voltage Vreg 166, and the transmit path in the headset amplifier 140 between headset 136 and telephone workstation 144 is broken. Headset amplifier 140 further includes an amplifier circuit 172 for amplifying a signal received from telephone workstation 144 to be output to a receiver 162 at headset 136.

The telephone workstation 144 circuit generally comprises an audio signal processing block 174 and a headset amplifier power detection circuit 196. In the example shown in FIG. 4, the headset amplifier power detection circuit 196 includes a microprocessor 106 with an A/D input 110 for identifying the power status of headset amplifier 140. Microprocessor 106 also includes a reference voltage Vref 108, a digital interface 112 and a digital interface 114. For example, digital interface 112 and digital interface 114 may be serial digital interfaces. A power supply regulator 178 provides a regulated voltage to microprocessor 106. A headset monitor signal 118 is provided to A/D input 110 from transmit line 194. Reference voltage Vref 108 is coupled to a first terminal of a resistor 116. The second terminal of resistor 116 is coupled to the transmit line 194. Digital interface 114 provides control of audio signal processing block 174. For example, the gain of amplifier 190 and amplifier 192 may be controlled by microprocessor 106 through digital interface 114.

In operation, when power from power source 142 is interrupted, FET 102 and FET 104 go to a high impedance state, resulting in a change in voltage on transmit line 194. The microprocessor 106 detects the change in voltage of headset monitor signal 118 at A/D input 110. The microprocessor 106 includes memory storing instructions for comparing the detected voltage with a predetermined threshold level to determine the power status of headset amplifier 140. Digital interface 112 outputs the headset power status to the ACD. Upon notification from telephone workstation 144 that the headset amplifier has insufficient power, the ACD responds accordingly as described above in reference to FIG. 3.

Figure 5:
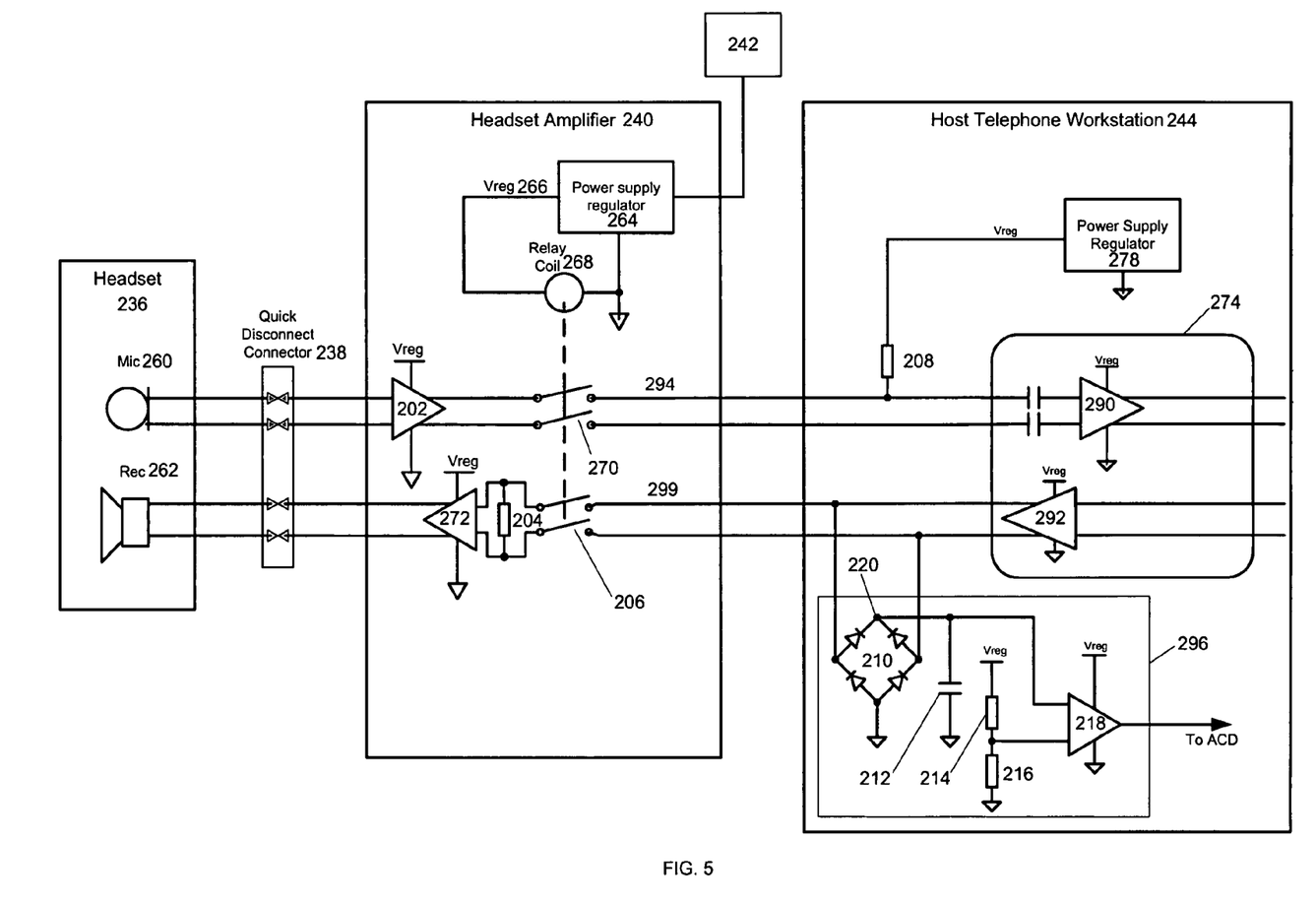
FIG. 5 illustrates a further example a loss of power detection system for headset amplifiers.

FIG. 5 illustrates a simplified detailed diagram of a circuit which may be used to implement the block diagram of FIG. 2 in a further example of the invention. FIG. 5 illustrates a further example of a headset amplifier switch and a further example of a headset amplifier power detection circuit.

As shown in FIG. 5, a headset amplifier 240 generally includes a power supply regulator 264 which is coupled to power supply 242. Power supply regulator 264 provides a regulated voltage Vreg 266 which energizes a relay coil 268 that closes relay contacts 270 and relay contacts 206 when power is received from power source 242. When power source 242 is lost, relay coil 268 de-energizes and relay contacts 270 and contacts 206 open. Headset amplifier 240 includes an amplifier circuit 272 for amplifying a signal received from host telephone workstation 244 to be output to a receiver 262 at headset 236. Relay contacts 270 are in the transmit path between a microphone 260 at headset 236 and the telephone workstation 244. Relay contacts 206 are in the receive path 299 between a receiver 262 and the telephone workstation 244. As a result, when relay contacts 270 and contacts 206 open, the transmit path 294 and receive path 299 in the headset amplifier 240 is broken. A resistive load 204 is placed between relay contacts 206 and amplifier 272. An amplifier 202 performs amplification on the transmit signal received from microphone 260.

The telephone workstation 244 circuit generally comprises an audio signal processing block 274 and a headset amplifier power detection circuit 296. In the example shown in FIG. 5, the host telephone workstation 244 power detection circuit 296 monitors the headset amplifier power status based on the impedance or voltage measured on the receive line 299. A regulated voltage Vreg is coupled to a first terminal of a resistor 214. The second terminal of resistor 214 is coupled to a first input of a comparator 218. The second terminal of resistor 214 is also coupled to a first terminal of a resistor 216. The second terminal of resistor 216 is coupled to a ground rail. A full-wave rectifier 210 is placed across the receive line 299. A first terminal of a capacitor 212 is coupled to terminal 220 of full wave rectifier 210. Terminal 220 is also coupled to a second input of comparator 218.

In operation, when power source 242 is lost, relay contacts 206 are opened, resulting in removal of resistive element 204 from detection by headset amplifier power detection circuit 296, which monitors the change in impedance on receive line 299, for example, thru the use of a pilot tone.

Audio signal processing block 274 performs processing on either the transmit signal received from microphone 60 or a receive signal from a far end user as described above in reference to FIG. 3. A power supply regulator 278 provides a regulated voltage Vreg to the transmit line 294 through a resistor 208. For example, an amplifier 290 may amplify the transmit signal and an amplifier 292 may amplify the receive signal.

In further example of the present invention, the headset 20 and headset amplifier 4 may be used for voice communications routed through a computer data network using protocols such as VoIP. In such an example, a computer server performs the functions of an ACD to route calls to a local computer at each operator. Combined telephony and data networks are well known in the art. In this example, the headset amplifier may utilize the Universal Serial Bus (USB) standard, plugging into a USB port on the local operator computer. Both voice signals (the telephone call) and data signals (agent not available signals) would be carried via the USB link between the headset amplifier and the local computer. In other respects, the headset and headset amplifier operate similar to the examples described above.

While the exemplary embodiments of the present invention are described and illustrated herein, it will be appreciated that they are merely illustrative and that Modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A telephone call distribution system comprising:
   a headset;
   a telephone apparatus;
   a headset amplifier coupled between the headset and the telephone apparatus, the headset amplifier comprising:
      a switch for electrically connecting the headset and the telephone apparatus, wherein the switch is adapted to open or close responsive to a headset amplifier power supply status; and
      an amplifier circuit, wherein the telephone apparatus detects when the headset amplifier is in a powered status or powerless status.

2. The telephone call distribution system of claim 1, wherein the switch is disposed in a transmit line between the headset and the telephone apparatus.

3. The telephone call distribution system of claim 1, wherein the switch is disposed in a receive line between the headset and the telephone apparatus.

4. The telephone call distribution system of claim 1, wherein the switch is disposed in both the receive and transmit lines between the headset and the telephone apparatus.

5. The telephone call distribution system of claim 2, wherein the telephone apparatus detects when the headset amplifier is in a powered status or powerless status by measuring the voltage level on the transmit line.

6. The telephone call distribution system of claim 3, wherein the telephone apparatus detects when the headset amplifier is in a powered status or powerless status by measuring the impedance or voltage present on the receive line.

7. The telephone call distribution system of claim 1, wherein the telephone apparatus is a computer implementing Voice-over-Internet Protocol.

8. The telephone call distribution system of claim 1, wherein the headset amplifier receives power from at least one member selected from the group consisting of a battery, a wall outlet, and a USB interface from a personal computer.

9. The telephone call distribution system of claim 1, wherein the switch is open when available power to the headset amplifier drops below a pre-determined threshold level.

10. The telephone call distribution system of claim 1, wherein the switch comprises a relay coil and relay contacts, wherein the relay contacts are closed when the relay coil is energized and the relay contacts are open when the relay coil is not energized.

11. The telephone call distribution system of claim 1, wherein the switch comprises a transistor.

12. The telephone call distribution system of claim 1, further comprising an automatic call distributor for receiving communication from the telephone apparatus regarding whether the headset amplifier is in a powered status or powerless status, wherein the automatic call distributor responsively routes incoming calls to or away from the telephone apparatus.

13. A headset system comprising:
   a headset comprising a microphone and a speaker;
   a headset amplifier for amplifying a signal received from a telephone apparatus to produce an amplified signal, or for amplifying a signal received from the headset to produce an amplified signal to the telephone apparatus, the headset amplifier comprising:
      a switch for electrically connecting the headset and the telephone apparatus, wherein the switch is adapted to open or close responsive to a headset amplifier power supply status.

14. The headset system of claim 13, wherein the headset amplifier receives power from at least one member selected from the group consisting of a battery, a wall outlet, and a USB interface from a personal computer.

15. The headset system of claim 13, wherein the switch is open when available power to the headset amplifier drops below a pre-determined threshold level.

16. The headset system of claim 13, wherein the switch comprises a relay coil and relay contacts, wherein the relay contacts are closed when the relay coil is energized and the relay contacts are open when the relay coil is not energized.

17. The headset system of claim 13, wherein the switch comprises a transistor.

18. The headset system of claim 13, wherein the switch is disposed in a transmit line from the headset microphone.

19. The headset system of claim 13, wherein the switch is disposed in a receive line between the headset and the telephone apparatus.

20. The headset system of claim 13, wherein the switch is disposed in both the receive and transmit lines between the headset and the telephone apparatus.

21. A headset amplifier comprising:
- a transmit line for receiving a transmit signal from a microphone at a headset and outputting the transmit signal to a telephone apparatus;
- a receive line for receiving a receive signal from the telephone apparatus and outputting the receive signal to a receiver at the headset, the receive line including a circuit means for controlling the gain of signals passing between the telephone apparatus and headset; and
- a switching means disposed in the transmit line or receive line for opening or closing responsive to the power status of the headset amplifier.

22. The headset amplifier of claim 21, wherein the transmit line further comprises a circuit means for controlling the gain of signals passing between the telephone apparatus and the headset.

* * * * *